J. L. MYERS.
Brake.
No. 113,193.
Patented Mar. 28, 1871.
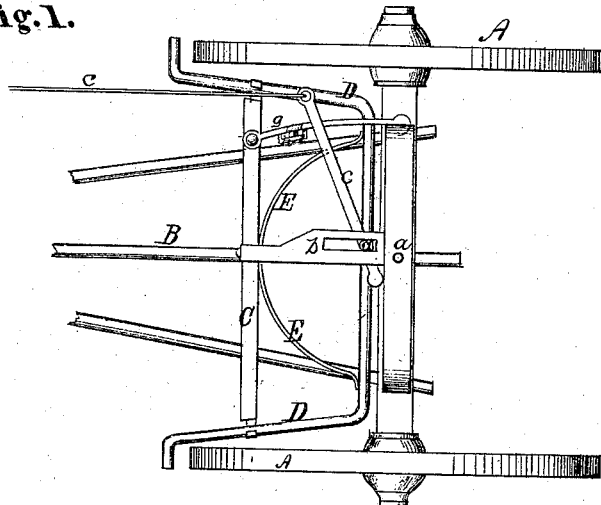
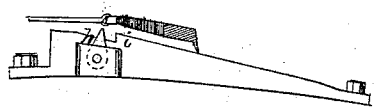
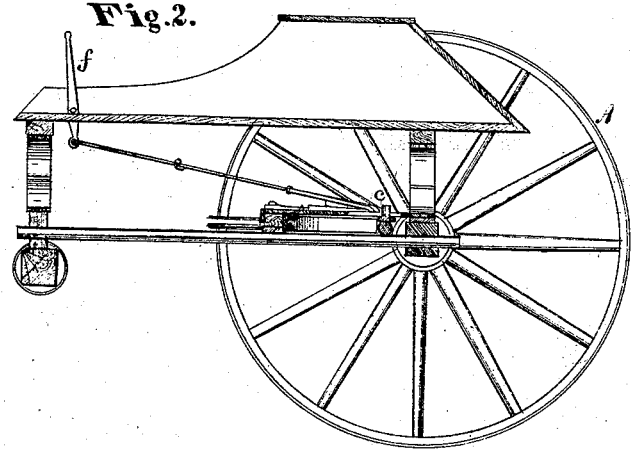
Witnesses
Cha Kenyon
Villette Anderson
Inventor.
J. L. Myers
Chipman. Hosmer & Co
attys

United States Patent Office.

ISAAC LAMBORN MYERS, OF FERGUSON TOWNSHIP, PENNSYLVANIA.

Letters Patent No. 113,193, dated March 28, 1871.

IMPROVEMENT IN BUGGY-BRAKES.

The Schedule referred to in these Letters Patent and making part of the same.

*To all whom it may concern:*

Be it known that I, ISAAC LAMBORN MYERS, of Ferguson township, in the county of Centre and State of Pennsylvania, have invented a new and valuable Improvement in Vehicle-Brakes; and I do hereby declare that the following is a full, clear, and exact description of the construction and operation of the same, reference being had to the annexed drawing making a part of this specification and to the letters and figures of reference marked thereon.

Figure 1 of the drawing is a plan view of my invention.

Figure 2 is a central vertical longitudinal section of the same.

Figure 3 is a detail.

My invention consists in a device for locking the brakes of buggies, and also certain parts for operating the same, all of which will be more fully described in the following specification.

In the drawing—

A represents a pair of buggy-wheels, on the axle-tree of which I pivot the bar B, as shown in fig. 1. This bar B is provided with a slot, $b$, and has secured to it, forward, the rest C for the bar.

The brake-bar D is curved or bent on each side, so as to reach the wheels.

A spring, E, is arranged between the lever-rest and the brake-bar, which throws the brake from the wheels.

The lever $c$ is provided with a pin, $d$, which slides in the slot $b$, one end of said lever serving as a fulcrum bearing against the axle-tree, and to the other is attached a rod, $e$, which has a lever, $f$, arranged at the other end, and is secured to the side of the body of the buggy. By this lever and rod the brake is operated.

Secured to the axle-tree and the rest C is the lever-rest $g$, which is provided with a small dog, $h$, plainly shown in fig. 3, over which the lever $c$ slides and is held either upon one side or the other, thereby locking or unlocking the brake.

When it is desired to lock the brake, the lever $f$ is drawn toward the seat of the buggy and is let loose quickly, when, by the action of the spring, it is thrown over the dog $h$, and is held by the notch $i$ on the lever-rest $g$, fig. 3; and to unlock, move the lever $f$ slowly forward and let it rest against the dash-board.

If preferred, a lever and proper connections may be arranged under the buggy or seat.

This arrangement of brake is very simple, and not liable to get out of order, and can be attached very easily to any buggy or vehicle.

Having thus described my invention,

What I claim as new and desire to secure by Letters Patent is—

1. The combination of the brake-bar D with spring E and rest C, lever $c$ and rest $g$, all substantially as shown and described.

2. The dog $h$, lever $c$, and rest $g$, in combination with the spring E, brake-bar D, and rest C, when all constructed, arranged, and operated substantially as shown and described, for the purposes set forth.

In testimony that I claim the above I have hereunto subscribed my name in the presence of two witnesses.

ISAAC LAMBORN MYERS.

Witnesses:
FREDRICK KRUMRINE,
LEVI KASTENBORDER.